(12) United States Patent
Calzolari et al.

(10) Patent No.: US 11,026,447 B2
(45) Date of Patent: Jun. 8, 2021

(54) VARIABLE-CAPACITY STORE

(71) Applicant: G.D SOCIETA' PER AZIONI, Bologna (IT)

(72) Inventors: Luca Calzolari, Bologna (IT); Michele Ferrari, Ozzano Emilia (IT); Luca Federici, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 0 days.

(21) Appl. No.: 16/754,475

(22) PCT Filed: Oct. 12, 2018

(86) PCT No.: PCT/IB2018/057927
§ 371 (c)(1),
(2) Date: Apr. 8, 2020

(87) PCT Pub. No.: WO2019/073447
PCT Pub. Date: Apr. 18, 2019

(65) Prior Publication Data
US 2020/0390144 A1 Dec. 17, 2020

(30) Foreign Application Priority Data
Oct. 12, 2017 (IT) .......................... 102017000115173

(51) Int. Cl.
*A24C 5/35* (2006.01)
*A24C 5/32* (2006.01)
(Continued)

(52) U.S. Cl.
CPC ................ *A24C 5/35* (2013.01); *A24C 5/322* (2013.01); *B65G 21/18* (2013.01); *B65G 47/5131* (2013.01); *B65G 2207/24* (2013.01)

(58) Field of Classification Search
CPC ............ B65G 47/5131; B65G 47/5122; B65G 47/5127; B65G 2207/24; B65G 21/18; B65G 47/268; A24C 5/35; A24C 5/322
(Continued)

(56) References Cited

U.S. PATENT DOCUMENTS

| 5,413,213 A * | 5/1995 | Golz .......................... A24C 5/35 |
| | | 198/778 |
| 6,725,997 B2 | 4/2004 | Draghetti |
| | (Continued) | |

FOREIGN PATENT DOCUMENTS

| CN | 1396101 A | 2/2003 |
| CN | 1558862 A | 12/2004 |
| | (Continued) | |

OTHER PUBLICATIONS

International Application No. PCT/IB2018/057927, International Search Report and Written Opinion, dated Jan. 18, 2019.

*Primary Examiner* — James R Bidwell
(74) *Attorney, Agent, or Firm* — Marshall, Gerstein & Borun LLP

(57) ABSTRACT

Variable-capacity store for cylindrical articles of the tobacco processing industry; the store comprises a conveying assembly comprising a first conveyor having a substantially helical shape; a second conveyor having a substantially helical shape and arranged above the first conveyor; and a linear transfer conveyor, which is adapted to convey the articles from the first conveyor to the second conveyor, having a variable length and, by extending and shortening, changes the area of the first conveyor from which it picks up the articles and the area of the second conveyor to which it feeds the articles, thus varying the capacity of the store.

13 Claims, 10 Drawing Sheets

(51) Int. Cl.
*B65G 47/51* (2006.01)
*B65G 21/18* (2006.01)

(58) Field of Classification Search
USPC ..................................... 198/347.1, 594, 812
See application file for complete search history.

(56) References Cited

U.S. PATENT DOCUMENTS

| | | | | |
|---|---|---|---|---|
| 7,011,205 | B2 | 3/2006 | Draghetti et al. | |
| 8,066,109 | B2* | 11/2011 | Engel | B65G 47/5122 |
| | | | | 198/347.1 |
| 8,770,376 | B2* | 7/2014 | Takens | B65G 47/5131 |
| | | | | 198/347.1 |
| 2003/0173185 | A1* | 9/2003 | Hammock | A24C 5/35 |
| | | | | 198/347.1 |
| 2004/0035678 | A1 | 2/2004 | Biondi et al. | |
| 2004/0216986 | A1* | 11/2004 | Spatafora | B65G 47/5122 |
| | | | | 198/778 |
| 2005/0016819 | A1 | 1/2005 | Draghetti et al. | |
| 2005/0217977 | A1* | 10/2005 | Hartness | B65G 47/5131 |
| | | | | 198/594 |
| 2014/0001008 | A1* | 1/2014 | Steeber | B65G 47/5127 |
| | | | | 198/347.1 |
| 2014/0138210 | A1* | 5/2014 | Buchhauser | B65G 47/5136 |
| | | | | 198/347.1 |
| 2018/0319591 | A1* | 11/2018 | Buffa | B65G 1/08 |

FOREIGN PATENT DOCUMENTS

| | | |
|---|---|---|
| EP | 0838165 A1 | 4/1998 |
| EP | 3205218 A1 | 8/2017 |
| JP | H0746977 A | 2/1995 |
| WO | WO-2013/141807 A1 | 9/2013 |

\* cited by examiner

VARIABLE-CAPACITY STORE

CROSS-REFERENCE TO RELATED APPLICATIONS

This is the U.S. national phase of PCT/IB2018/057927, filed Oct. 12, 2018, which application claims priority from the benefit of Italian Patent Application No. 102017000115173, filed on Dec. 10, 2017 Oct. 12, 2017.

TECHNICAL FIELD

The present invention relates to a variable-capacity store for articles, in particular cylindrical articles of the tobacco processing industry.

BACKGROUND ART

In the tobacco processing industry variable-capacity stores for cigarettes, of the type described in patent EP581143 are known. Said stores comprise a variable-length storage path having two conveying portions wound around each other on a common axis with loops having the same inclination; and a deviation device, which is adapted to move the cigarettes from one portion to the other and is movable along both portions so as to vary the overall length of the storage path.

EP838165 discloses a variable-capacity store comprising two helical conveyors arranged one above the other and connected by an intermediate element adapted to transfer, only by gravity, the products from the upper conveyor to the lower conveyor. The two conveyors work pneumatically.

This type of stores has several drawbacks, among which the following will be mentioned.

The particular arrangement of the two conveying portions arranged one inside the other not only makes the structure and construction of the stores particularly complex and expensive but also significantly complicates the maintenance work.

Moreover, the stores are not very ductile since it is not possible to provide input and output stations for cylindrical articles arranged in opposite positions (for example, one at the bottom and one at the top). More specifically, what is described in EP581143 and EP838165 provides that the output of the articles is at the bottom, a position not particularly convenient for the layouts of the current machines (such as, for example, cigarette packaging machines or combiners for combining filters and tobacco pieces) that can be found downstream of the stores.

It should also be noted that the pneumatic conveyors (as described for example in EP838165) are relatively indelicate with the articles (in particular, the cigarettes). In fact, this type of conveyor cannot only damage the articles with relative ease but can lead to the detachment and dispersion of particles (for example of tobacco) from the articles themselves.

It is also noted that a feeding exclusively by gravity of relatively delicate articles (such as the cigarettes) can lead to the damage of the articles and/or to the creation of blockage.

EP3205218 describes a device for conveying, in bulk, articles of the tobacco industry. The device comprises conveying means, which are guided along a conveying path through a guided trajectory adapted as a first and a second helix arranged around a common vertical axis.

DISCLOSURE OF INVENTION

The object of the present invention is to provide a variable-capacity store, which allows to overcome, at least partially, the drawbacks of the prior art and is, at the same time, easy and inexpensive to produce.

In accordance with the present invention, a variable-capacity store is provided according to what is recited in the following independent claim and, preferably, in any one of the claims directly or indirectly dependent on the aforementioned independent claim.

BRIEF DESCRIPTION OF THE DRAWINGS

The present invention will now be described with reference to the accompanying drawings, which illustrate a non-limiting embodiment thereof, wherein.

BEST MODE FOR CARRYING OUT THE INVENTION

Figure 1:
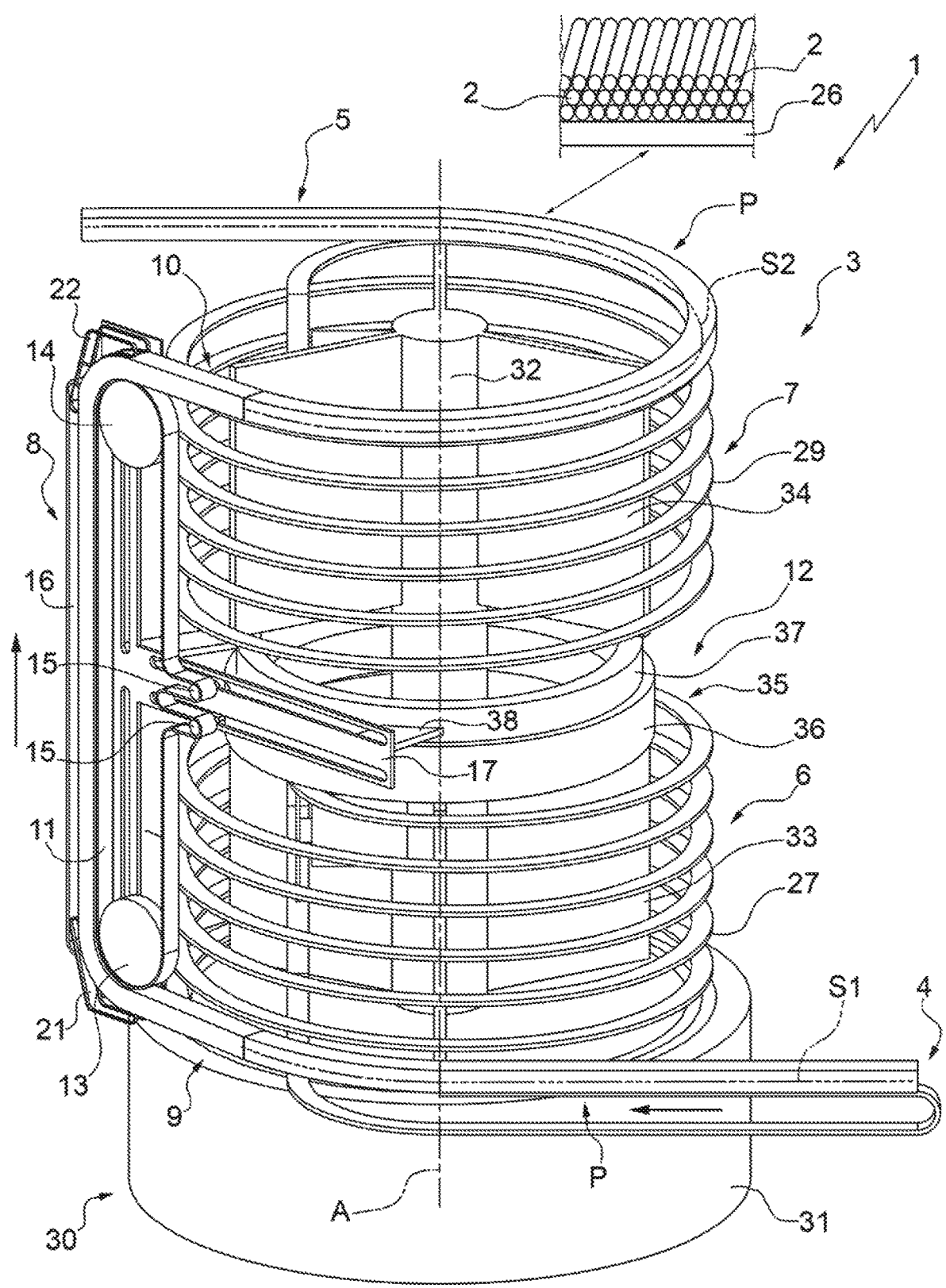
FIGS. 1 to 5 are perspective views in successive operational configurations of a store implemented according to the present invention.
Figure 2:
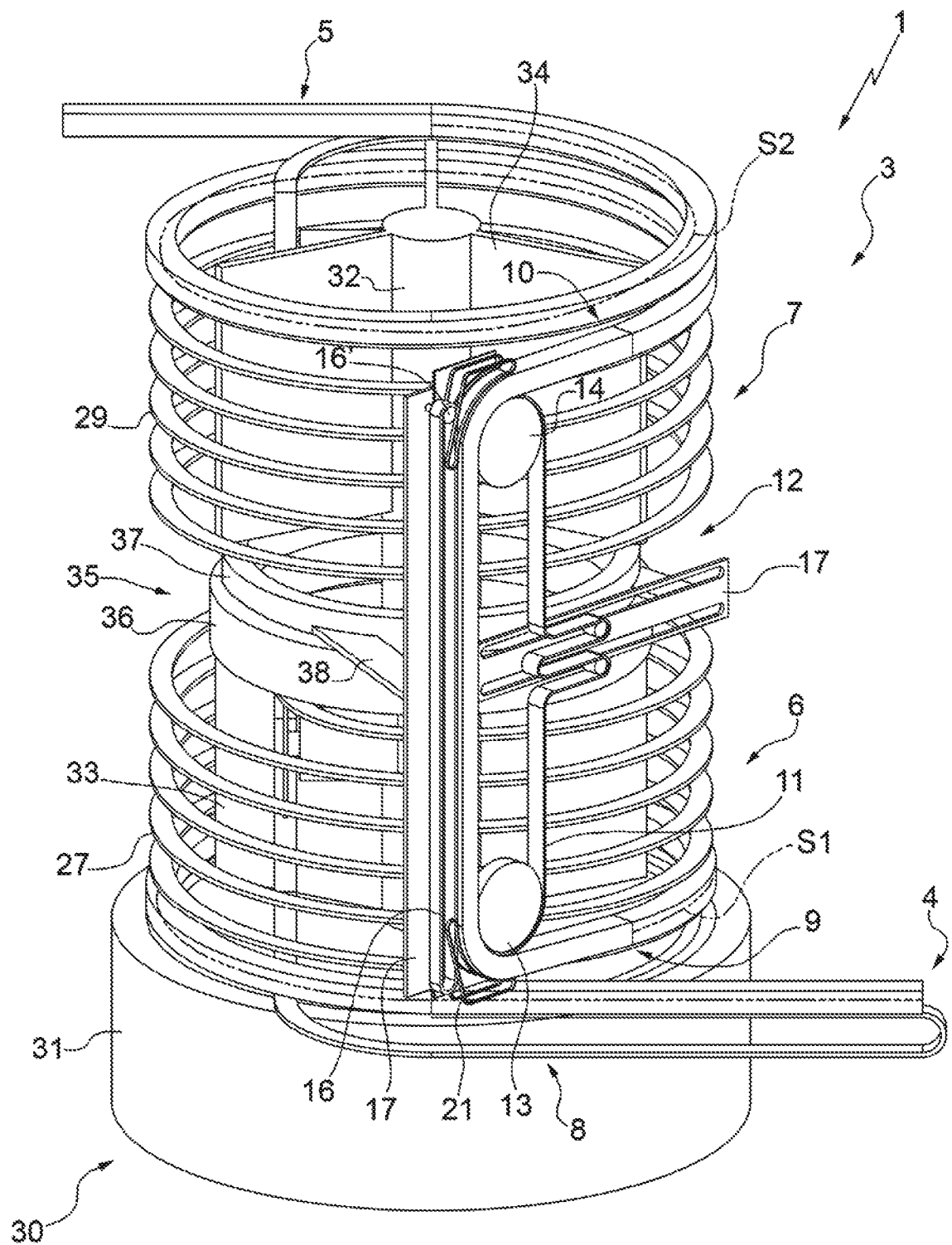
Figure 3:
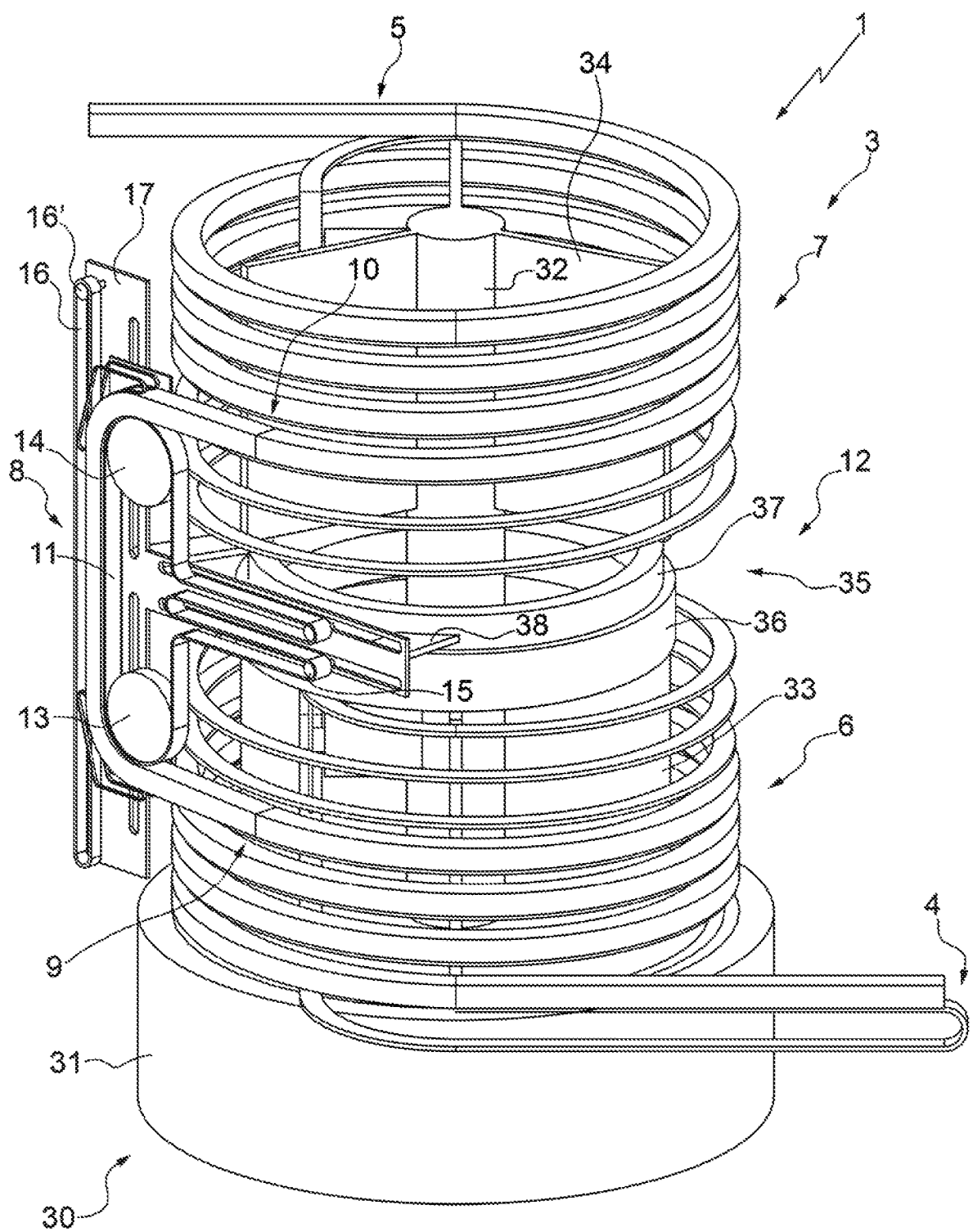
Figure 4:
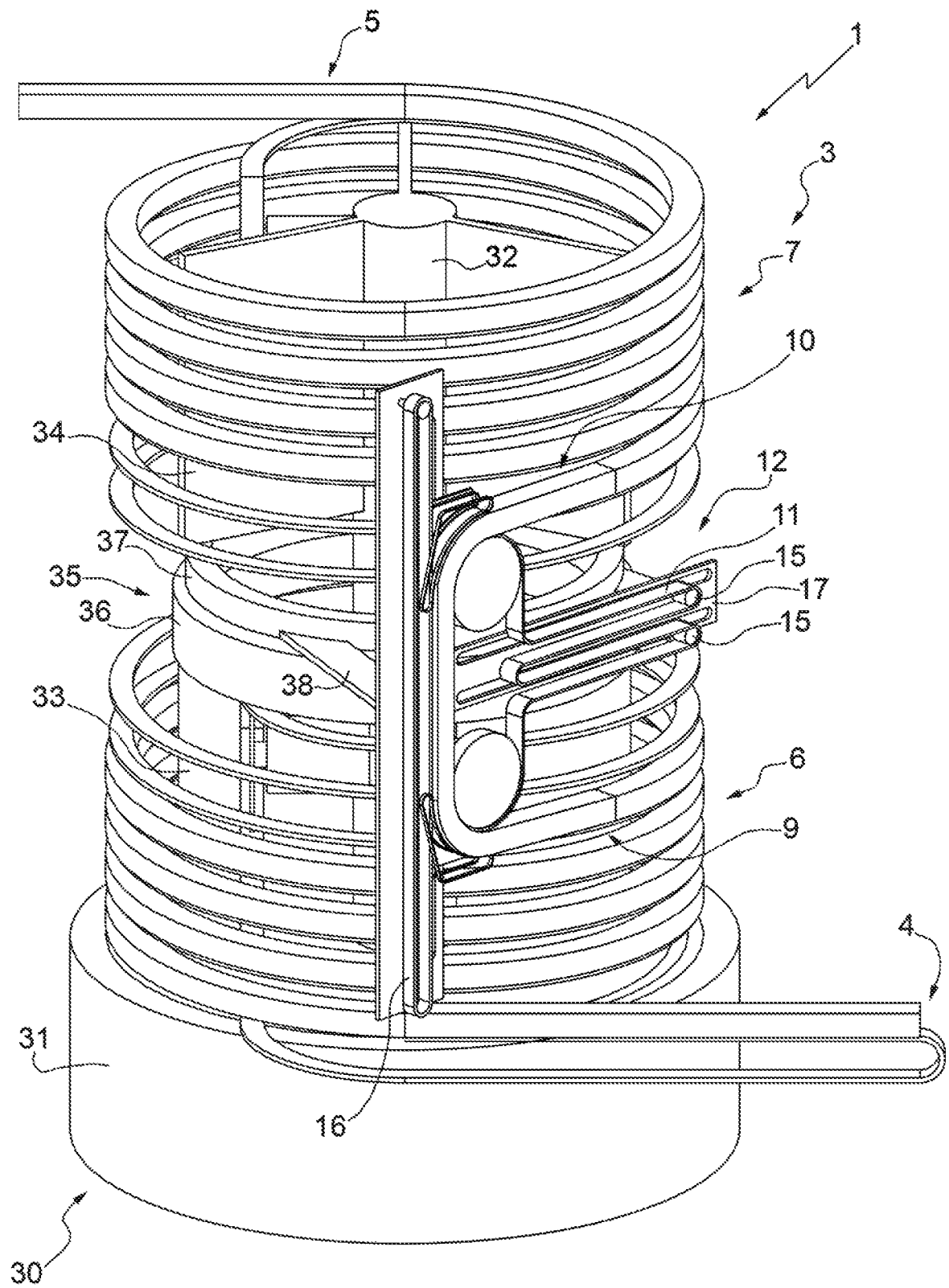
Figure 5:
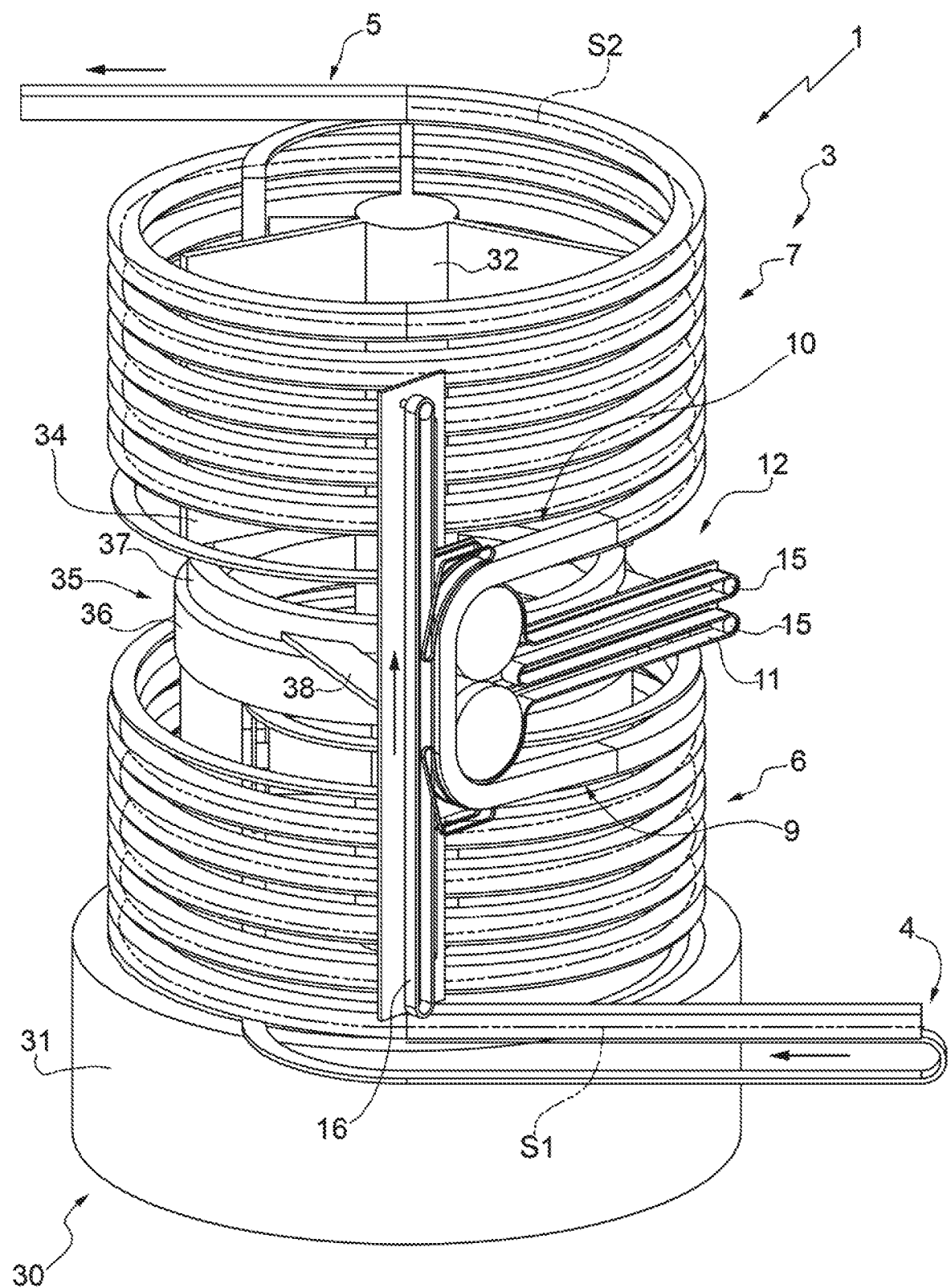
Figure 6:
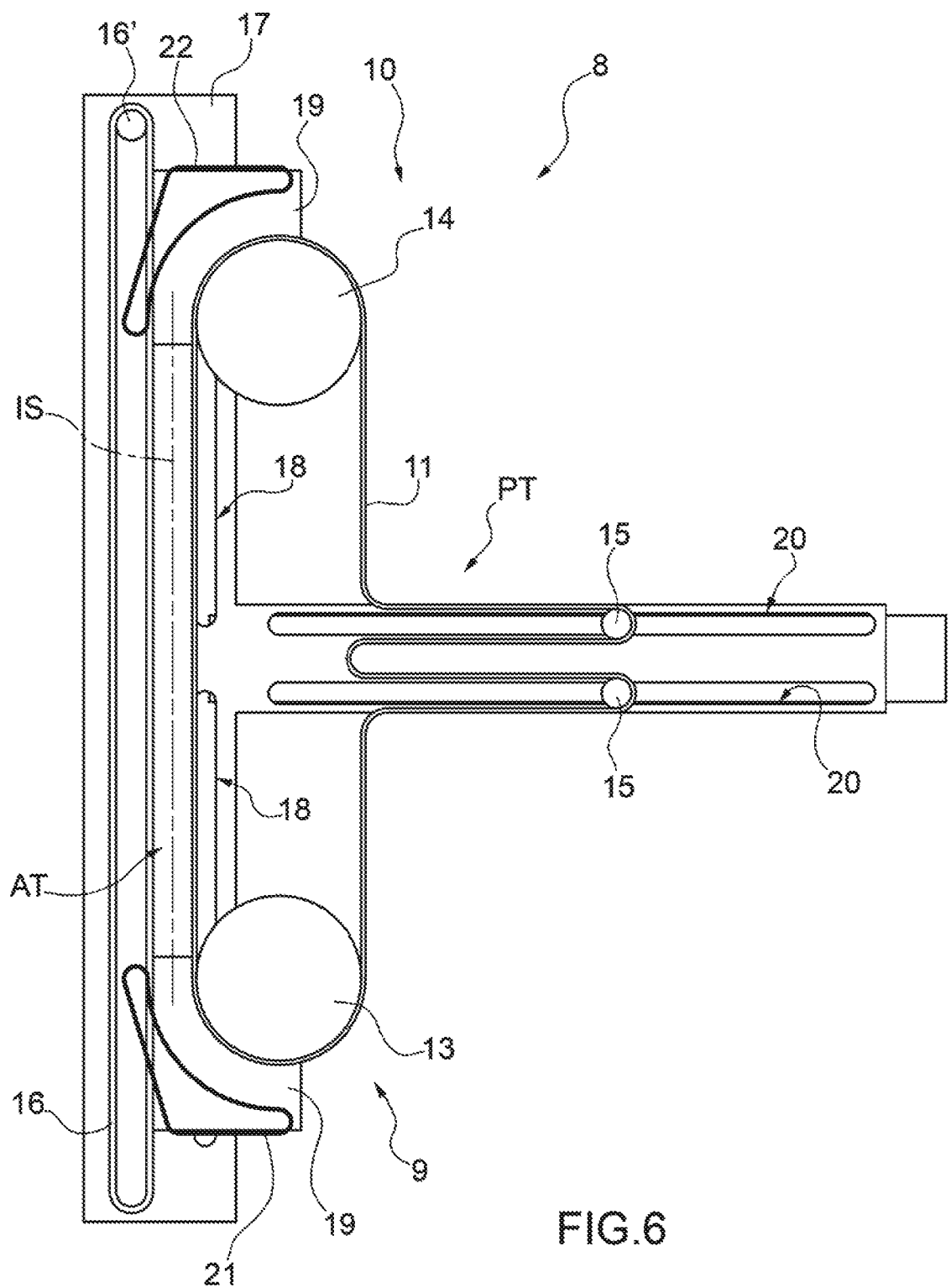
FIG. 6 is a side view of a component of the store of FIGS. 1-5.

In the accompanying figures, 1 denotes as a whole a variable-capacity store for articles 2. The store comprises a conveying assembly 3 for conveying the articles 2 (in particular, in bulk) from an input station 4 to an output station 5 along a path P with a variable length.

In particular, the articles 2 are substantially cylindrical articles of the tobacco processing industry. For example, the articles 2 are cigarettes, cigarette filters, components (pieces) of cigarette filters and/or pieces of tobacco. According to some specific and non-limiting embodiments, the articles 2 are cigarettes.

The conveying assembly 3 comprises a conveyor 6 for feeding the articles 2 from the input station 4 along a segment S1 of the path P; at least one conveyor 7 for feeding the articles 2 to the output station 5 along a segment S2 of the path P; and at least one transfer conveyor 8, which is adapted to convey the articles 2 from the conveyor 6 to the conveyor 7 along an intermediate segment IS (in particular, substantially linear) of the path P and has an input 9, which is arranged in the area of the segment S1 for receiving the articles 2 from the conveyor 6, and an output 10, which is arranged in the area of the segment S2 for feeding the articles to the conveyor 7.

In particular, the conveyors 6 and 7 (and, in some cases, also the transfer conveyor 8) are endless conveyors.

According to some non-limiting embodiments, the transfer conveyor 8 is arranged between the conveyors 6 and 7.

Advantageously but not necessarily, the transfer conveyor 8 is arranged beside the conveyors 6 and 7.

Advantageously but not necessarily, the transfer conveyor 8 is adapted to convey the articles 2 upwards.

The segment S1 (which, in particular, has a substantially helical shape) extends from the input station 4 to the input 9. The segment S2 (which, in particular, has a substantially helical shape) extends from the output 10 to the output station 5.

The transfer conveyor 8 has at least one feeding device 11 adapted to accompany (at least partially) the articles 2, by moving (together with the articles) along the intermediate segment IS.

In particular, the feeding device 11 comprises (is) an elongated element closed on itself. According to some non-limiting embodiments, the feeding device 11 comprises (is) a belt, a conveyor belt and/or a chain.

Due to the presence of the feeding device 11, the risks of blocking the articles 2 along the intermediate segment IS, and of damaging the articles 2, while, in use, they are conveyed along the intermediate segment IS, are reduced. Due to the feeding device 11 it is also possible to feed the articles 2 from the conveyor 6, which is arranged at the bottom of the conveyor 7 arranged at the top.

Advantageously but not necessarily, the feeding device 11 is adapted to move (at least partially) the articles 2, by moving (together with the articles) along the intermediate segment IS.

In particular, the intermediate segment IS extends between the input 9 and the output 10 (in some cases, from the input 9 to the output 10).

The input 9 and the output 10 are movable along the conveyor 6 and the conveyor 7, respectively. The store 1 comprises a moving assembly 12 for moving the transfer conveyor 8 so as to move the input 9 and the output 10 along the conveyor 6 and the conveyor 7, respectively, and thus varying (accordingly) the length of the intermediate segment IS and of the segments S1 and S2. In particular, by extending the segments S1 and S2, the capacity of the store 1 is increased; by shortening the segments S1 and S2 the capacity of the stores 1 is decreased.

In particular, each conveyor 6 and 7 has at least one respective winding (loop). Advantageously but not necessarily, each conveyor 6 and 7 has a plurality of respective windings (loops). In other words, each conveyor 6 and 7 is wound upon itself so as to have a plurality of windings (loops). More particularly, the winding direction of the conveyor 6 is opposite to the winding direction of the conveyor 7. For example, if (looking from above) the winding direction of the conveyor 7 is clockwise, the winding direction (always looking from above) of the conveyor 6 is counter clockwise.

Advantageously but not necessarily, the conveyor 6 has a plurality of first windings (loops) and the conveyor 7 has a plurality of second windings (loops) having the same radius and the same pitch as the first windings.

According to specific non-limiting embodiments, the conveyor 6 has a plurality of loops with a constant radius and pitch; the conveyor 7 has a plurality of loops with a constant radius and pitch. More precisely, the conveyor 6 has at least one segment with a helical (cylindrical) shape with a constant radius and pitch; the conveyor 7 has at least one segment with a helical (cylindrical) shape with a constant radius and pitch.

According to alternatives and not illustrated embodiments, each winding comprises two curved end portions and two linear central portions. In these cases, for example, the windings extend around two drums having parallel axes (see, for example, FIG. 1 of EP738478 of the same applicant).

Advantageously but not necessarily, the transfer conveyor 8 comprises a pulley 13 and a pulley 14, around which the feeding device 11 is partially wound.

In particular, store 1 (more precisely, the transfer conveyor 8) comprises at least one operating assembly (of a type known per se and not illustrated) for rotating at least one of the pulleys 13 and 14. More in particular, note that the transfer conveyor 8 is structured so that the output 10 is arranged at the pulley 14 and the input 9 is arranged at the pulley 13.

According to some non-limiting embodiments, the aforementioned operating assembly comprises (is) a motor and/or a kinematic mechanism connected to other parts of the store 1.

Advantageously but not necessarily, the store 1 (more precisely, the transfer conveyor 8) comprises an actuator assembly (of a type known per se and not illustrated) to move the pulleys 13 and 14 closer to or further away from each other, particularly in a longitudinal extension direction of the intermediate segment IS (more particularly, in a substantially vertical direction).

According to some non-limiting embodiments, the aforementioned actuator assembly comprises (is) a motor and/or a kinematic mechanism connected to other parts of the store 1.

In particular, the aforementioned actuator assembly is adapted to vary the distance between the pulleys 13 and 14 as a function of (proportionally to) the difference between the speeds at which the conveyor 6 and the conveyor 7 convey the articles 2. More specifically, the actuator assembly is adapted to vary the distance between the pulleys 13 and 14 with a speed proportional to the difference between the speeds at which the conveyor 6 and the conveyor 7 convey the articles 2.

According to some non-limiting embodiments, the feeding device 11 comprises an active segment AT with a variable length that extends along the intermediate segment IS between the pulleys 13 and 14 and a passive segment PT, which is arranged on the opposite side of the pulleys 13 and 14 with respect to the active segment AT (in other words, so that the pulleys 13 and 14 are arranged between the active segment AT and the passive segment PT). The passive segment PT extends between the pulleys 13 and 14 and partially around at least one further pulley 15 of the transfer conveyor 8, which also comprises a further actuator assembly (also known per se and not illustrated) for moving the pulley 15 (further away from and closer towards the intermediate segment IS).

It should be noted that, advantageously, the relative movement between the pulleys 13 and 14 and the movement of the pulley 15 are mutually connected so that one compensates the other (and the feeding device 11 always remains correctly tensioned). In other words, when the active segment AT is shortened by a given length, the passive segment PT is extended by the given length and vice versa.

In some non-limiting cases, the further actuator assembly comprises a kinematic mechanism which transfers, according to a defined proportional ratio (for example 1 to 1), the relative movement (more precisely, the displacement) of the pulleys 13 and 14 towards the pulley 15.

According to some specific and non-limiting embodiments (as the one illustrated), the transfer conveyor 8 comprises at least two pulleys 15 and at least three fixed pulleys (known per se and not illustrated). In these cases, the relative movement between the pulleys 15 on one side and the fixed pulleys on the other compensate for the relative movement between the pulleys 13 and 14.

Advantageously but not necessarily, the transfer conveyor 8 comprises at least one further feeding device 16, which is arranged facing the feeding device 11 and is adapted to move along the intermediate segment IS (in particular, in a coordinated manner with the feeding device 11, more precisely, at the same speed as the feeding device 11). In particular, the feeding device 11 and the feeding device 16 are adapted to clamp the articles 2 together and to at least partially accompany them (move them) along the intermediate segment IS.

More precisely, the feeding device 16 comprises (is) a belt, a drive belt and/or a chain.

According to some non-limiting embodiments, the feeding device is wound around a pair of pulleys 16' (one of which is illustrated). In particular, one of the pulleys 16' is connected by means of a kinematic mechanism (of a type known per se and not illustrated) to at least one of the pulleys 14 and 13, which kinematic mechanism (connected to a motor) is adapted to transfer the rotary motion to the pulleys 13 and 14 to the pulley 16' so that the speeds of the feeding devices 11 and 16 are equal to each other.

Due to the feeding device 16, the risks are further reduced of creating blockage of articles 2 along the intermediate segment IS, and that the articles 2 are damaged while, in use, they are conveyed along the intermediate length IS. Due to the feeding device 16 it is also possible to improve the feeding of the articles 2 from the conveyor 6, which is arranged at the bottom of the conveyor 7 arranged at the top.

According to some non-limiting embodiments, the transfer conveyor 8 comprises a plate 17 on which the aforementioned pulleys are mounted (in particular the pulleys 13 and 14 and possibly the pulley 15, the pulleys 16' and the fixed pulleys). In particular, the plate 17 has slots 18 which act as guides for the pulleys 13 and 14. In other words, in use, each pulley 13 and 14 slides along a respective slot 18. More precisely, the transfer conveyor 8 comprises two flat supports 19, on which the pulleys 13 and 14, respectively, are mounted (in a rotatable manner) and which are slidable along the slots 18. Even more precisely, the aforementioned actuator assembly (not illustrated) is adapted to move the flat supports 19.

In addition or alternatively, the plate 17 has slots 20 which act as a guide for the pulley(s) 15. In other words, in use, the pulley/s 15 slides/slide along a respective slot 20.

Advantageously but not necessarily, the transfer conveyor 8 comprises a first chute (not illustrated) which is arranged at the input 9 and adapted to guide the articles 2 from the conveyor 6 towards the intermediate segment IS; and a second chute (not illustrated) which is arranged at the output 10 and adapted to guide the articles 2 coming from the segment IS towards the conveyor 7. Each chute moves in the direction of the longitudinal extension of the intermediate segment IS integrally with a respective pulley 13 and 14. More precisely, each chute is mounted in a fixed manner to a respective flat support 19.

According to some non-limiting embodiments, the transfer conveyor 8 comprises, furthermore, a deviator belt 21 which is arranged at the pulley 13 to direct (by modifying their feeding direction) the articles 2, coming from the input 9, in the intermediate segment IS. In addition or alternatively, the transfer conveyor 8 further comprises a deviation belt 22 which is arranged at the pulley 14 to direct (by modifying their feeding direction) the articles 2, coming from the intermediate segment IS, towards the output 10.

In particular, the deviator belts 21 and 22 are movable relative to one another in an integral manner with the pulleys 13 and 14, respectively. More precisely, the deviator belts 21 and 22 are each mounted on a respective flat support 19.

Advantageously but not necessarily, the conveyors 6 and 7 are arranged so that one is (at least partially) above the other. In particular, the conveyor 7 is arranged (at least partially) above the conveyor 6 (and the output station 5 is arranged higher than the input station 4). In this way it is possible to have the output 10 in a relatively high position.

Advantageously but not necessarily, the output station 5 is arranged higher than the output 10, which is, in turn, arranged higher than the input 9 and above the input station 4.

More precisely (the conveyors 6 and 7 are arranged so that), the segments S1 and S2 are substantially coaxial to one another.

According to some non-limiting embodiments, the intermediate segment IS is (linear and) substantially parallel to an axis A around which the segment S1 and the segment S2 are wound.

Advantageously but not necessarily, the moving assembly 12 is adapted to rotate the transfer conveyor 8 around the axis A.

In use, while the moving assembly 12 rotates the transfer conveyor 8 around the axis A, the input 9 (more precisely, the respective chute) moves (slides) along the conveyor 6 and the output 10 (more precisely, the respective chute) moves (slides) along the conveyor 7. In order to have the conveyor 6 following the input 9 and the conveyor 7 following the output 10, the distance between the pulleys 13 and 14 is accordingly varied.

Figures from 1 to 5 show the store 1 in successive operating steps while the store 1 is filled. These figures illustrate what has been mentioned above, i.e. that a variation in the length of the segment IS (in other words, a variation of the distance between the pulleys 13 and 14) is also associated to the rotation movement.

Figure 10:
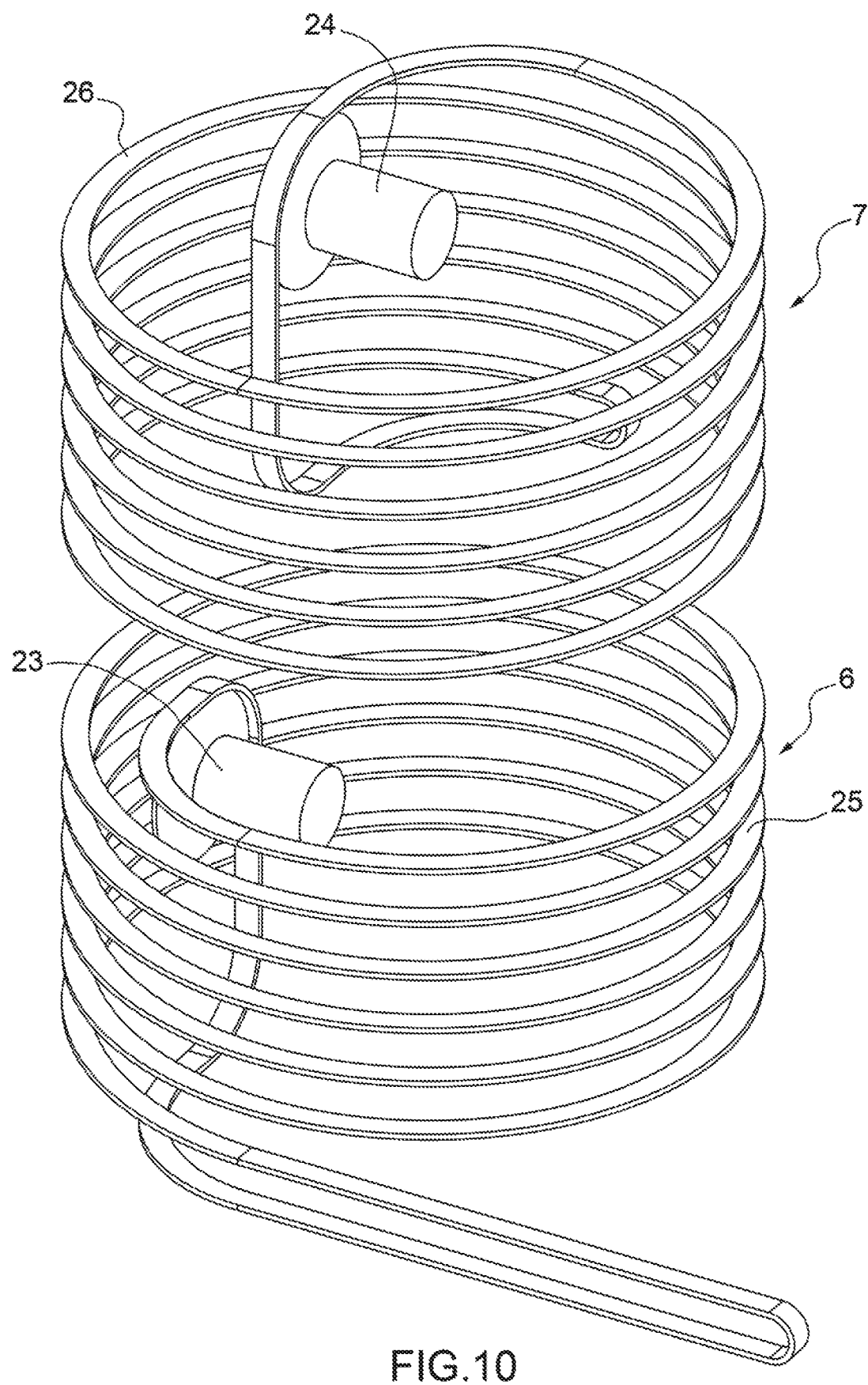
FIG. 10 is a perspective view of components of the store of FIGS. 1-5.

As better illustrated in FIG. 10, the conveyor 6 comprises at least one motorized pulley 23 and the conveyor 7 comprises at least one motorized pulley 24. The pulleys 23 and 24 are adapted to allow the movement of a conveying element 25 and of a conveying element 26, respectively, along the segment S1 and S2, respectively, and along the respective return segments. The segments S1 and the respective return segment together define a path closed upon itself (typical of an endless conveyor). The segments S2 and the respective return segment together define a path closed upon itself (typical of an endless conveyor).

The conveying element 25 is, according to some non-limiting embodiments, a belt, a conveyor belt and/or a chain. Advantageously but not necessarily, the conveying element 25 is a chain. More precisely, the conveying element 25 is a chain, for example, described in U.S. Pat. No. 6,364,094 and/or WO2013141807.

The conveying element 26 is, according to some non-limiting embodiments, a belt, a conveyor belt and/or a chain. Advantageously but not necessarily, the conveying element 26 is a chain. More precisely, the conveying element 26 is a chain, for example, described in U.S. Pat. No. 6,364,094 and/or WO2013141807.

The conveying elements 25 and 26 allow the articles 2 to be handled delicately.

Figure 7:
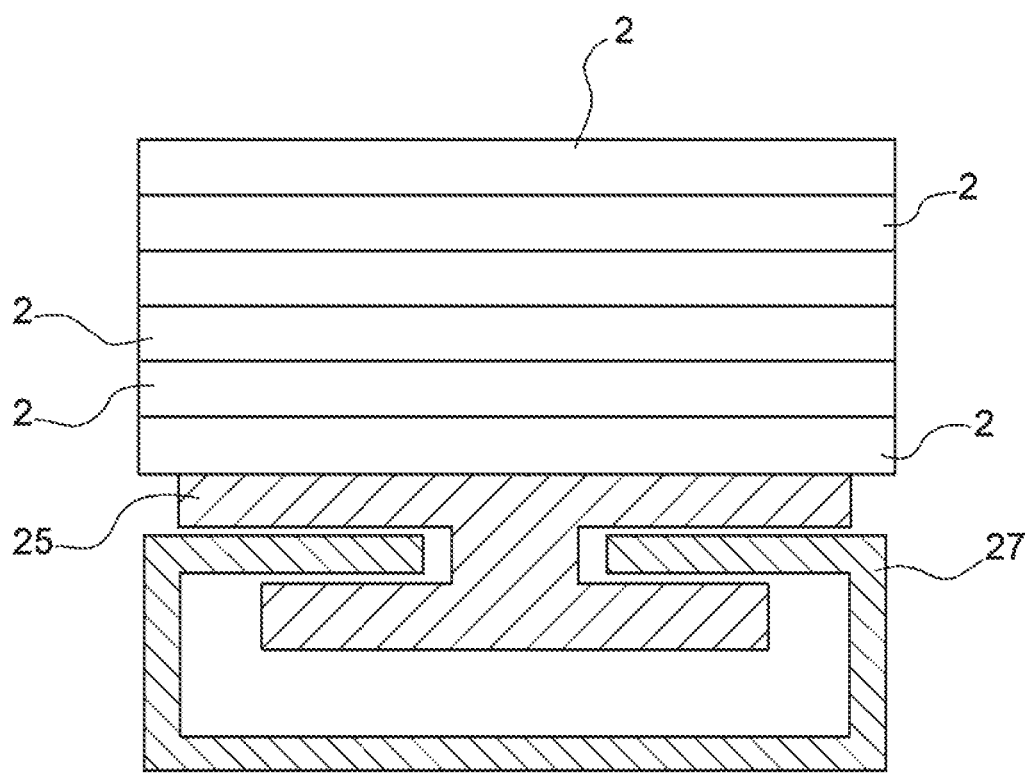
FIG. 7 is a section of a detail of the store of FIGS. 1-5.

In particular, the conveyor 6 comprises (FIG. 7) a guide (a track) 27 provided with a recess 28 inside which a (lower) projection of the conveying element 25 extends. Due to this structure, the element 25 follows the guide 27 and moves along the segment S1. In this regard, it should be noted that the guide 27 extends along the path S1; more precisely, the guide 27 has the shape of the path S1 (and defines the path S1).

A guide (track) 29 of the conveyor 7 has a structure and a function similar to the guide 29. Guide 29 extends along the path S2; more precisely, the guide 29 has the shape of the path S2 (and defines the path S1).

Figure 8:
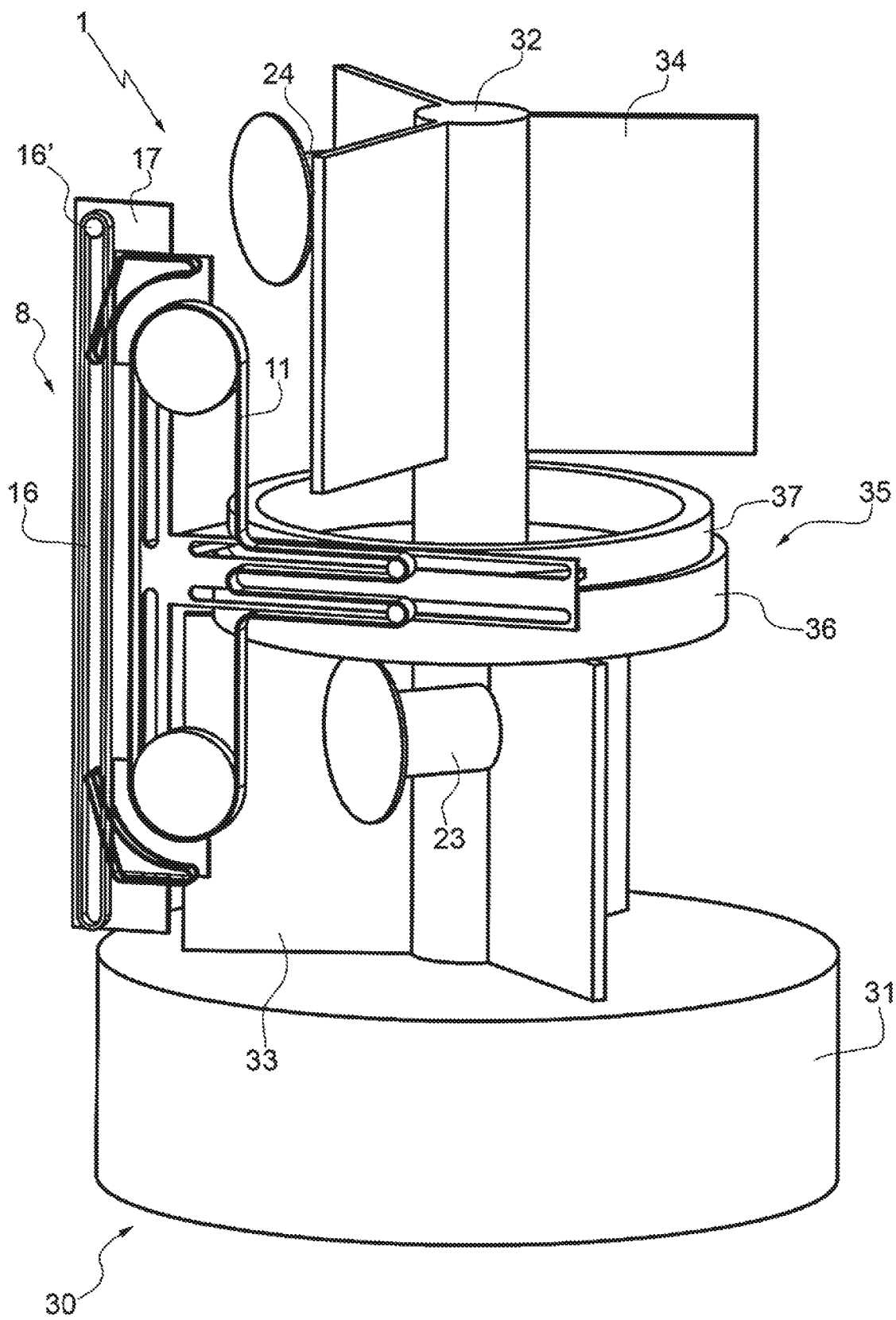
FIG. 8 is a perspective view of the machine of FIGS. 1-5 with some details removed for clarity.
Figure 9:
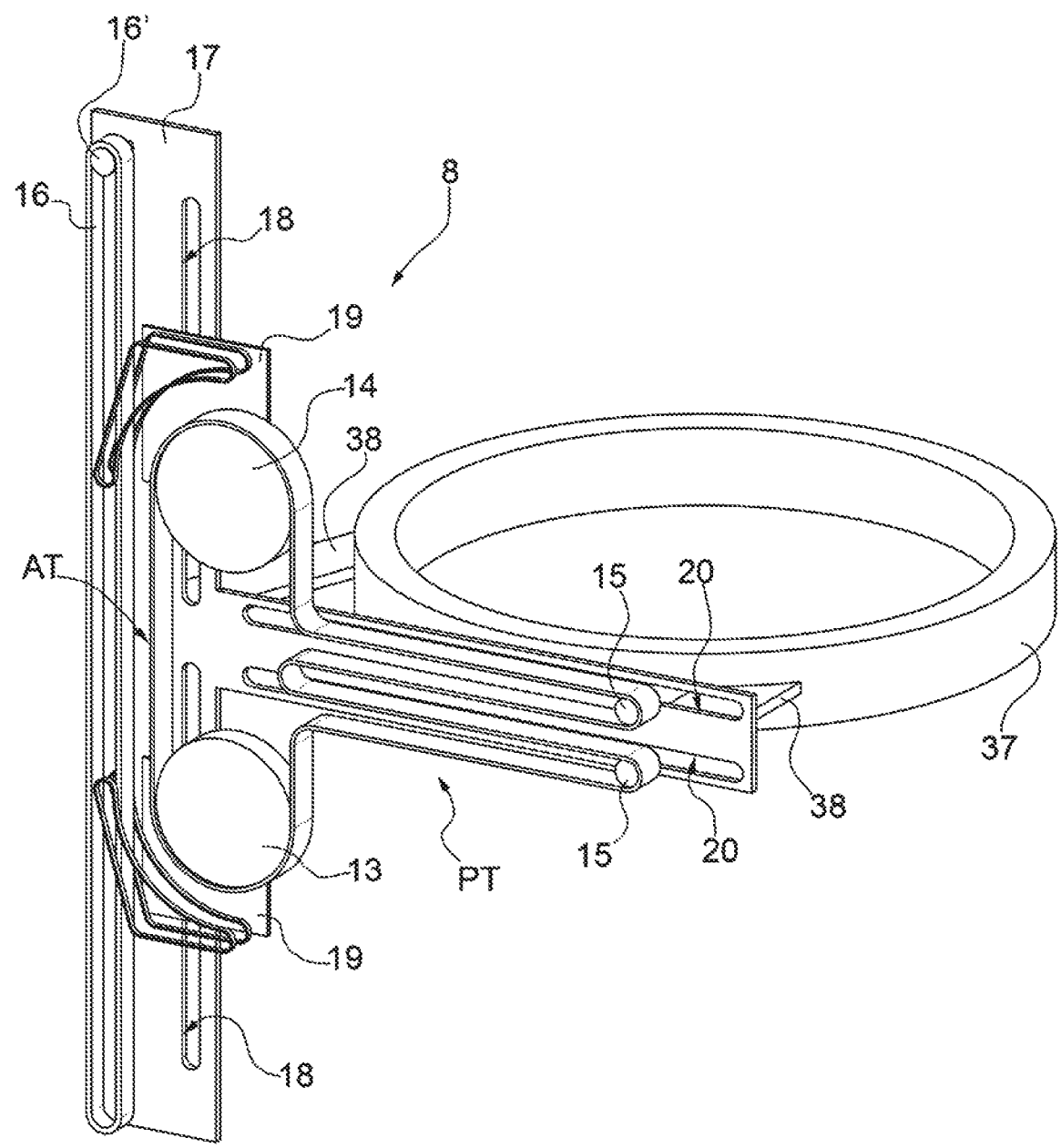
FIG. 9 is a perspective view of the component of FIG. 6 connected to a further element.

With particular reference to FIG. 8, according to some non-limiting embodiments, the store 1 also comprises a main support structure 30 carrying the conveyors 6 and 7 (more precisely, the guides 27 and 29) and the transfer conveyor 8.

The main support structure 30 comprises a base 31 and a support column 32 projecting (perpendicularly) from the base 31. In particular, the column 32 extends parallel to the axis A; more particularly, the column 32 extends along the axis A (in other words, the axis A is—also—the longitudinal axis of the column 32). More precisely, the column 31 has a vertical orientation.

According to some non-limiting embodiments, the main support structure 30 also comprises a support assembly 33 fixed onto the column 32 and carrying the conveyor 6 (more precisely, the guide 27) and a support assembly 34 fixed onto the column 32, spaced apart from the support assembly 33 and carrying the conveyor 7 (more precisely, the guide 29).

Moreover, in some cases (such as the one illustrated), the main support structure 30 also comprises a bearing 35, which, in particular, is interposed between the support assembly 33 and the support assembly 34 and is carried by the support assembly 33. The bearing 35 is part of the moving assembly 12. More precisely, the bearing 35 comprises a fixed portion 36 mounted on the support assembly 33 and a movable portion 37 adapted to rotate around the axis A and carrying the transfer conveyor 8. In even more detail, the transfer conveyor 8 is mounted integral with the bearing 35 (more precisely, with the movable portion 34) by means of two arms 38.

According to some non-limiting embodiments, the moving assembly 12 comprises at least one motor (of a type known per se and not illustrated) adapted to move the transfer conveyor (more precisely, to rotate the transfer conveyor 8 around the axis A). In these cases, in particular, the store 1 comprises sensors (encoders—of known type and not illustrated) for detecting the speed difference between the conveyors 6 and 7 (more precisely, between the motorized pulleys 24 and 25) and a control unit to operate the moving assembly 12 according to said difference.

Advantageously but not necessarily, the aforementioned actuator assembly (to move the pulleys 13 and 14 closer to or further away from each other) comprises a kinematic mechanism (for example a gear system of the worm-geared type) connected to the motor of the moving assembly 12 to transmit the motion (according to a particular proportion) to the pulleys 13 and 14 (to move closer to or further away from each other).

Advantageously but not necessarily, the transfer conveyor 8 is adapted to adjust the speed at which the length of the intermediate segment changes based on the rotation speed imparted by the moving assembly 12 around the rotation axis, in particular according to the function:

$$\dot{L} = 2\left(\omega\sqrt{r^2 + \left(\frac{p}{2\pi}\right)^2}\right) - \frac{p\omega}{\pi}$$

where ω indicates the rotation speed and $\dot{L}$ indicates the variation speed of the length of the intermediate segment.

According to some embodiments, the moving assembly 12 comprises a mechanical connection adapted to move the transfer conveyor 8 (more precisely, to rotate the transfer conveyor 8 around the axis A) proportionally to the differences in speed between the conveyors 6 and 7 (more precisely, between the motorized pulleys 24 and 25).

Typically, in use, the store 1 is placed between a first machine (for example, a machine for producing cigarettes) and a second machine (for example, a packaging machine) so as to compensate for the different speeds at which the first machine feeds the articles 2 to the stores 1 and the second machine uses the articles 2 coming from the stores. More specifically, the store 1 comprises a control system connected to the first and to the second machine (for receiving information on speeds) and adapted to adjust the speed of the conveyor 6 so as to adapt it to the speed of the first machine and to adjust the speed of the conveyor 7 in order to adapt it to the speed of the second machine.

The store 1 according to the present invention has several advantages with respect to the state of the art. Among other things, to point out that in this way it is possible to have a rather complex structure that allows relatively simple maintenance interventions. Moreover, the store 1 is particularly ductile, being adapted also to have an output station at the top (in a particularly convenient position for the layouts of the current machines), and delicate in the handling of the articles 2. The risks of creating the blockage of articles 2 are further reduced.

Unless explicitly stated otherwise, the content of references (articles, texts, patent applications, etc.) mentioned in this text is here, for completeness of description, fully referred to. In particular, the aforementioned references are incorporated herein by reference.

The invention claimed is:

1. A variable-capacity store for articles (2), in particular substantially cylindrical articles of the tobacco processing industry; the store (1) comprises a conveying assembly (3) to convey the articles (2) from an input station (4) to an output station (5) along a path (P) with a variable length;

the conveying assembly (3) comprises a first conveyor (6), which has at least one winding and is designed to feed the articles (2) from the input station (4) along a first segment (S1) of the path (P); at least one second conveyor (7), which has at least one winding and is designed to feed the articles (2) to the output station (5) along a second segment (S2) of the path (P); and at least one transfer conveyor (8), which is designed to convey the articles (2) from the first conveyor (6) to the second conveyor (7) along an intermediate segment (IS) of the path (P) and has an input (9), which is arranged in the area of the first segment (S1) so as to receive the articles (2) from the first conveyor (6), and an output (10), which is arranged in the area of the second segment (S2) so as to feed the articles (2) to the second conveyor (7); the first segment (S1) extends from the input station (4) to the input (9); the second segment (S2) extends from the output (10) to the output station (5);

the transfer conveyor (8) has at least one first feeding device (11), which is designed to at least partially accompany the articles (2), moving along the intermediate segment (IS); said input (9) and said output (10) are movable along the first and the second conveyor (6, 7), respectively; the store (1) comprising a moving assembly (12) to move the transfer conveyor (8) so as to move said input (9) and said output (10) along the first and the second conveyor (6, 7), respectively, and change the length of the intermediate segment (IS) and of the first and the second segment (S1, S2).

2. A store according to claim 1, wherein the first feeding device (11) comprises, in particular is, a conveying element chosen in the group consisting of: a belt, a drive belt, a chain, and a combination thereof.

3. A store according to claim 1, wherein the transfer conveyor (8) comprises a first and at least a second pulley (13, 14), around which the first feeding device (11) is partially wound; the store (1) comprising at least one operating assembly to rotate at least one between the first and the second pulley (13, 14); said input (9) being arranged in the area of the first pulley (13); said output (10) being arranged in the area of the second pulley (14).

4. A store according to claim 3, wherein the transfer conveyor (8) comprises an actuator assembly to move the first and the second pulley (13, 14) close to or away from one another, in particular in a substantially vertical direction.

5. A store according to claim 4, wherein the actuator assembly is designed to change the distance between the first and the second pulley (13, 14) based on the difference between the speeds at which the first and the second conveyor (6, 7) convey the articles (2); in particular, the actuator assembly is designed to change the distance between the first and the second pulley (13, 14) proportionally to the difference between the speeds at which the first and the second conveyor (6, 7) convey the articles (2).

6. A store according to claim 4, wherein the feeding device (11) comprises an active segment (AT) with a variable length, which extends along the intermediate segment (IS) between the first and the second pulley (13, 14), and a passive segment (PT), which is arranged on the opposite side of the first and the second pulley (13, 14) relative to the active segment (AT); the passive segment (PT) extends between the first and the second pulley (13, 14) and partially around at least a third pulley (15) of the transfer conveyor (8), which also comprises a further actuator assembly to move the third pulley (15) away from and towards the intermediate segment (IS).

7. A store according to claim 1, wherein the transfer conveyor (8) comprises at least one second feeding device (16), which faces the first feeding device (11) and is designed to move along the intermediate segment (IS); the first feeding device (11) and the second feeding device (16) are designed to clamp the articles (2) and to at least partially accompany them along the intermediate segment (IS).

8. A store according to claim 1, wherein the first and the second conveyor (6, 7) are arranged in such a way that one is at least partially above the other one, in particular the second conveyor (7) is at least partially arranged above the first conveyor (6); the winding direction of the first conveyor (6) being opposite to the winding direction of the second conveyor (7).

9. A store according to claim 1, wherein the first and the second conveyor (6, 7) have windings that are substantially coaxial to one another.

10. A store according to claim 9, wherein the intermediate segment (IS) is substantially parallel to an axis around which the windings of the first and the second conveyor (6, 7) are wound.

11. A store according to claim 10, wherein said moving assembly (12) is designed to rotate the transfer conveyor (8) around said axis (A).

12. A store according to claim 11, wherein the transfer conveyor (8) is designed to change the speed at which the length of the intermediate segment changes based on the rotation speed generated by the moving assembly (12) around the axis (A), in particular according to the function:

$$\dot{L} = 2\left(\omega\sqrt{r^2 + \left(\frac{p}{2\pi}\right)^2}\right) - \frac{p\omega}{\pi}$$

wherein ω indicates the rotation speed and L indicates the speed of variation of the length of the intermediate segment (IS).

13. A store according to claim 1, wherein the first conveyor (6) has a plurality of first windings (loops); the second conveyor (7) has a plurality of second windings having the same radius and the same pitch as the first windings.

* * * * *